United States Patent
Utagawa et al.

(10) Patent No.: US 9,953,227 B2
(45) Date of Patent: Apr. 24, 2018

(54) IN-VEHICLE IMAGE PROCESSING DEVICE

(71) Applicant: CLARION CO., LTD., Saitama-shi, Saitama (JP)

(72) Inventors: Akira Utagawa, Tokyo (JP); Takeshi Shima, Tokyo (JP); Shoji Muramatsu, Tokyo (JP); Masao Sakata, Saitama (JP); Yoshitaka Uchida, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 15/500,120

(22) PCT Filed: Jun. 16, 2015

(86) PCT No.: PCT/JP2015/067250
§ 371 (c)(1),
(2) Date: Jan. 30, 2017

(87) PCT Pub. No.: WO2016/051885
PCT Pub. Date: Apr. 7, 2016

(65) Prior Publication Data
US 2017/0270370 A1    Sep. 21, 2017

(30) Foreign Application Priority Data

Sep. 29, 2014  (JP) ................... 2014-199017

(51) Int. Cl.
*G06K 9/00*    (2006.01)
*B60R 1/00*    (2006.01)
(Continued)

(52) U.S. Cl.
CPC ............ *G06K 9/00791* (2013.01); *B60R 1/00* (2013.01); *B60R 21/00* (2013.01); *B60W 30/06* (2013.01);
(Continued)

(58) Field of Classification Search
USPC ........................................... 382/104
See application file for complete search history.

(56) References Cited

U.S. PATENT DOCUMENTS 7,266,219 B2 * 9/2007 Okamoto ............... B60R 1/00
                                                   340/901
7,363,130 B2 * 4/2008 Sakakibara ............ G08G 1/161
                                                   340/932.2
(Continued)

FOREIGN PATENT DOCUMENTS

JP    2010-019752 A    1/2010
JP    2012-017021 A    1/2012
(Continued)

OTHER PUBLICATIONS

International Search Report, PCT/JP2015/067250, dated Sep. 8, 2015, 1 pg.
(Continued)

*Primary Examiner* — Ishrat I Sherali
(74) *Attorney, Agent, or Firm* — Volpe and Koenig, P.C.

(57) ABSTRACT

An in-vehicle image processing device processes camera images to determine a parkable area and includes an overhead image generation section generating an overhead image relative to a road surface by converting the view point of an image of a nearby vehicle and the road surface taken by a vehicle-mounted camera; a tire recognition section recognizing the tires of the nearby vehicle; a three-dimensional object recognition section recognizing three-dimensional objects including the nearby vehicle; an area-under-vehicle recognition section calculating the ground contact position of the tire and the above-ground height from the ground contact position to the vehicle body and recognizing an area under the vehicle body on the road surface from the overhead image; and a parkable area recognition section for recognizing the area occupied by the vehicle body and the
(Continued)

area under the vehicle body as a non-parking area and recognizing a parkable area on the road surface.

7 Claims, 7 Drawing Sheets

(51) Int. Cl.
    *B60R 21/00*     (2006.01)
    *G06T 1/00*     (2006.01)
    *G08G 1/16*     (2006.01)
    *H04N 7/18*     (2006.01)
    *B60W 30/06*     (2006.01)
    *B60W 10/18*     (2012.01)
    *B60W 10/20*     (2006.01)

(52) U.S. Cl.
    CPC ............... *G06T 1/00* (2013.01); *G08G 1/16* (2013.01); *H04N 7/18* (2013.01); *B60K 2350/106* (2013.01); *B60K 2350/2013* (2013.01); *B60R 2300/105* (2013.01); *B60R 2300/303* (2013.01); *B60R 2300/607* (2013.01); *B60R 2300/806* (2013.01); *B60W 10/18* (2013.01); *B60W 10/20* (2013.01); *B60W 2420/42* (2013.01); *B60W 2510/18* (2013.01); *B60W 2510/20* (2013.01); *B60W 2520/105* (2013.01); *B60W 2710/18* (2013.01); *B60W 2710/20* (2013.01); *B60W 2720/106* (2013.01)

(56) References Cited

U.S. PATENT DOCUMENTS

| | | | |
|---|---|---|---|
| 7,930,078 B2* | 4/2011 | Sugiura | B60R 1/00 340/435 |
| 8,130,270 B2* | 3/2012 | Ito | B60R 1/00 348/118 |
| 8,401,235 B2* | 3/2013 | Lee | G01S 15/025 340/435 |
| 2009/0174574 A1* | 7/2009 | Endo | B60R 1/00 340/932.2 |
| 2014/0036076 A1* | 2/2014 | Nerayoff | H04N 7/181 348/148 |
| 2015/0035983 A1* | 2/2015 | Niemz | G06K 9/00805 348/148 |

FOREIGN PATENT DOCUMENTS

| | | |
|---|---|---|
| JP | 2013-193527 A | 9/2013 |
| JP | 2015-064797 A | 4/2015 |

OTHER PUBLICATIONS

Written Opinion of International Patent Application No. PCT/JP2015/067250 dated Sep. 8, 2015 (Japanese language), 4 pgs.

* cited by examiner

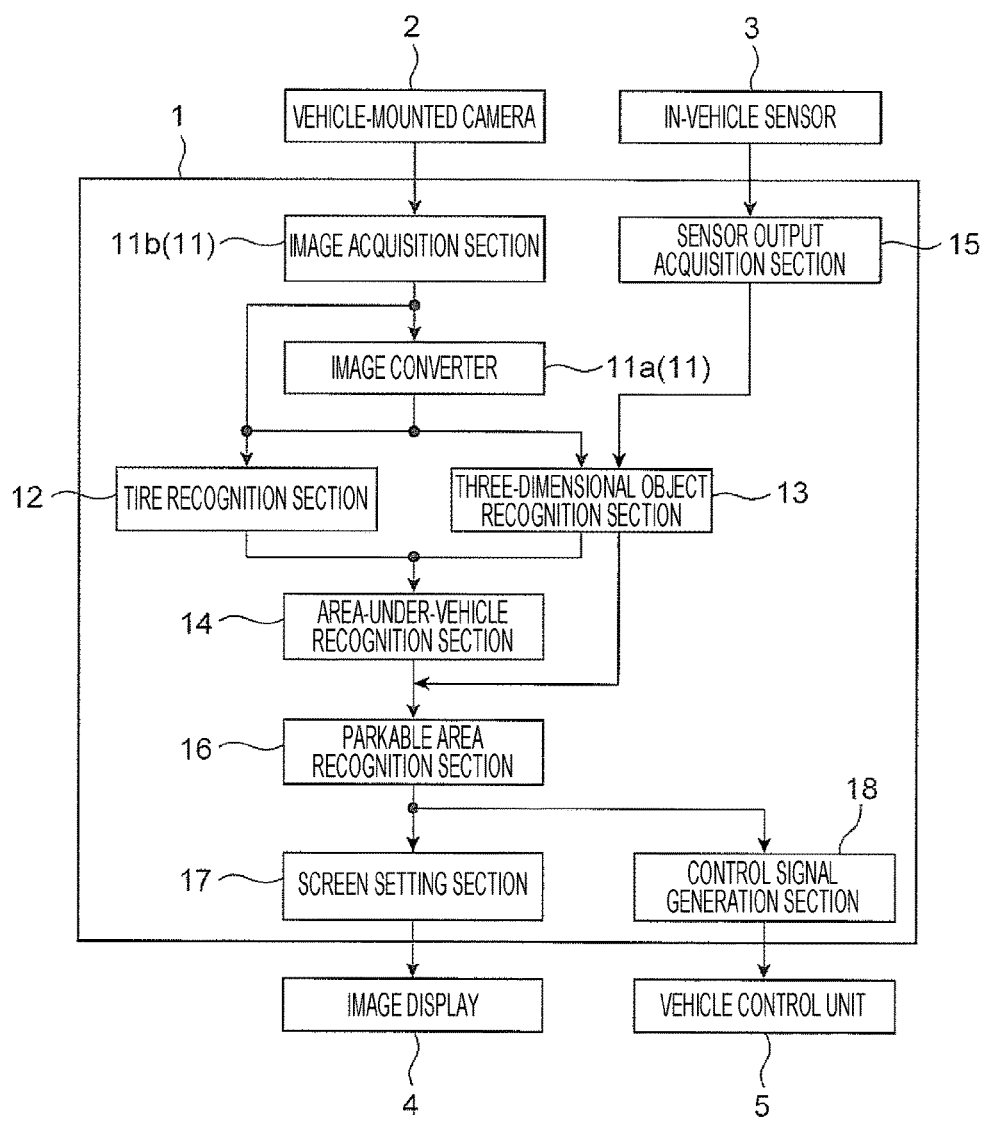

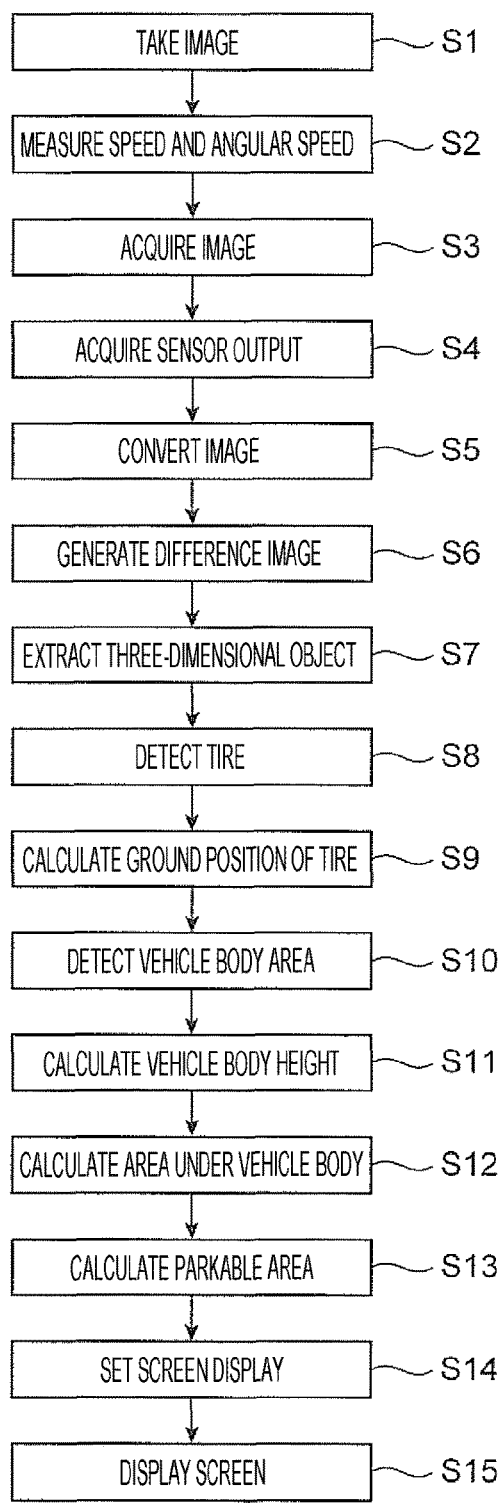

IN-VEHICLE IMAGE PROCESSING DEVICE

TECHNICAL FIELD

The present invention relates to an in-vehicle image processing device used for parking assistance of an automobile, for example.

BACKGROUND ART

In recent years, in-vehicle image processing devices capable of determining whether there is a parkable area on the basis of an image of a vehicle-mounted camera have been developed. As an example of this kind of device, there is known a device for estimating width of a vehicle (refer to PTL 1, for example).

The device described in PTL 1 estimates width of a vehicle according to a procedure below to determine whether there is a parkable area. First, an image of the vehicle is taken, and a wheel and a license plate of the vehicle are recognized from the image taken. Next, a first point in the recognized license plate is projected on a virtual plane parallel to a road surface. Subsequently, second and third points on the recognized wheel along the vehicle longitudinal direction are projected on the virtual plane and a first line is set so as to connect the second and third points to each other. Next, a second line extending from the first point is set so as to be orthogonal to the first line and an intersection of the first line and the second line is calculated. Then, width of the vehicle is estimated on the basis of a distance between the intersection and the center of the recognized license plate in a vehicle lateral direction.

CITATION LIST

Patent Literature

PTL 1: Japanese Unexamined Patent Publication No. 2010-19752

SUMMARY OF INVENTION

Technical Problem

The device described in PTL 1 is based on the premise that a license plate of a vehicle is recognized to determine whether there is a parkable area. Thus, for example, in a case such as where a vehicle before mounting a license plate is moved and parked, or a license plate cannot be recognized by some cause, it is impossible to determine whether there is a parkable area.

The present invention is made in light of the problem above, and an object thereof is to provide an in-vehicle image processing device capable of recognizing a parkable area around a vehicle by processing an image taken by a camera mounted in the vehicle without being based on the premise that a license plate of the vehicle is recognized.

Solution to Problem

To achieve the object, an in-vehicle image processing device of the present invention for recognizing a parkable area around a vehicle includes: an overhead image generation section configured to generate an overhead image with a road surface as a reference by converting a view point of an image of a nearby vehicle and the road surface taken by a vehicle-mounted camera; a tire recognition section configured to recognize the tires of the nearby vehicle from the image or the overhead image; a three-dimensional object recognition section configured to recognize, from the camera image or the overhead image, three-dimensional objects including a vehicle body of the nearby vehicle; an area-under-vehicle recognition section configured to calculate a ground contact position of the tire and an above-ground height from the ground contact position to the vehicle body and recognize an area under the vehicle body on the road surface from the overhead image based on the above-ground height; and a parkable area recognition section configured to recognize an area occupied by the vehicle body and the area under the vehicle body as a non-parkable area and recognize, based on the non-parkable area, a parkable area on the road surface.

Advantageous Effects of Invention

The in-vehicle image processing device of the present invention processes camera images to generate an overhead image around a vehicle and recognizes a vehicle body of a nearby vehicle and an area under the vehicle body thereof from the overhead image, and thus enables a parkable area around the vehicle to be recognized without being based on the premise that a license plate of the vehicle is recognized and enables a target parking position to be correctly recognized even if there is no parking lot line.

BRIEF DESCRIPTION OF DRAWINGS

FIG. 2 is a block diagram illustrating a configuration of an in-vehicle image processing device and its peripheral devices.

FIG. 6 is a flow chart illustrating processing steps of the in-vehicle image processing device.

DESCRIPTION OF EMBODIMENTS

Hereinafter, an embodiment of the in-vehicle image processing device of the present invention will be described with reference to the accompanying drawings.

Figure 1A:
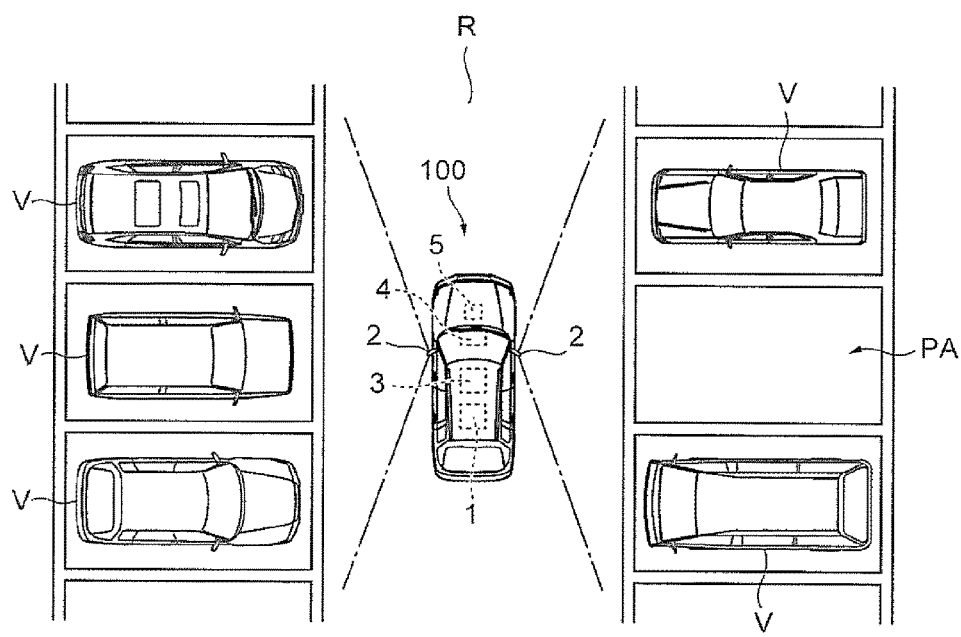
FIG. 1A is an assumed plan view of a case where a vehicle is to be parked in a parking space between nearby vehicles.
Figure 1B:
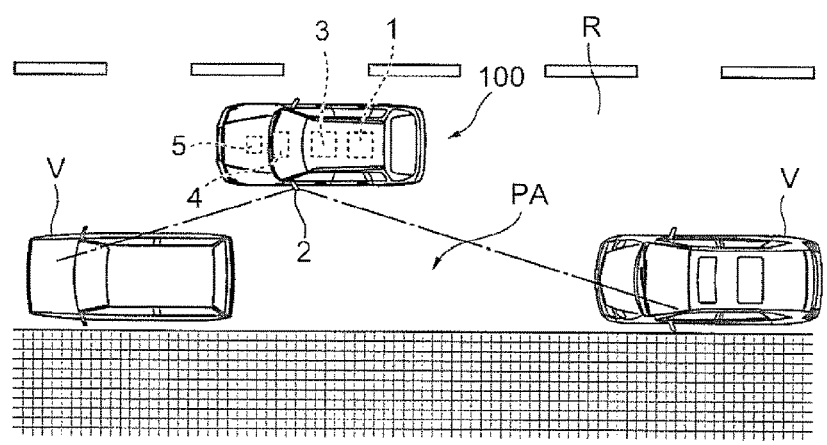
FIG. 1B is an assumed plan view of a case where a vehicle is to be parked in a parking space between nearby vehicles.

FIGS. 1A and 1B each are an assumed plan view of a case where a vehicle 100 is parked in a parking space between nearby vehicles V. FIG. 2 is a block diagram illustrating a configuration of an in-vehicle image processing device 1 and its peripheral devices.

The vehicle 100 is provided with the in-vehicle image processing device 1, a vehicle-mounted camera 2, an in-vehicle sensor 3, an image display 4, and a vehicle control unit 5. The in-vehicle image processing device 1 of the present embodiment processes an image taken by the vehicle-mounted camera 2 to determine a parkable area PA between three-dimensional objects including the nearby vehicles V around the vehicle 100. Hereinafter, a configuration of the in-vehicle image processing device 1 and other devices, mounted in the vehicle 100, will be described in detail.

The vehicle-mounted camera 2 digitally converts a video captured through a lens and an image sensor and outputs image data. As the vehicle-mounted camera 2, a CCD camera is used, for example. The vehicle-mounted camera 2 is usually modularized as a camera module and is provided in a side mirror at a side of the vehicle 100, for example, to widely take an image of the side of the vehicle 100 from obliquely front of the vehicle 100 to obliquely rear of the vehicle 100. The vehicle-mounted camera 2 may be provided not only in the side of the vehicle 100 but also in the front and rear of the vehicle 100, and thus the plurality of vehicle-mounted cameras 2 may take images of the side of the vehicle 100 as well as the front and rear of the vehicle 100.

The in-vehicle sensor 3 includes a speed sensor, an acceleration sensor, an angular speed sensor, gyroscope, a global positioning system (GPS), and the like, for example, to measure speed, acceleration, angular speed, position, and the like of the vehicle 100 and output the measurement as measurement data. In addition, the in-vehicle sensor 3 can output a traveling route, a travel distance, and the like of the vehicle 100 as the measurement data, for example.

The image display 4 is an image display device that is disposed at a position so as not to interfere with operation of the vehicle 100 by a driver and to be visible to the driver. As the image display 4, for example, a liquid crystal display device, an organic EL display, a head-up display, and other known image display devices are available. The image display 4 displays an image processed by the in-vehicle image processing device 1 on the basis of setting of the in-vehicle image processing device 1.

The vehicle control unit 5 controls the vehicle on the basis of a control signal output from the in-vehicle image processing device 1. Specifically, the vehicle control unit 5 controls operation of a steering, a gear, an accelerator, a brake, and the like of the vehicle 100, for example, on the basis of a difference, such as a difference between a present position of the vehicle 100 and a position in the parkable area PA at which the vehicle 100 is to be parked, the difference being included in the control signal from the in-vehicle image processing device 1, to park the vehicle 100 in the parkable area PA by automatic operation.

The in-vehicle image processing device 1 of the present embodiment is realized by a central processing unit (CPU), a storage device that the CPU can directly access, a program stored in the storage device, and the like, for example. The in-vehicle image processing device 1 mainly includes an image converter 11a as an overhead image generation section 11, a tire recognition section 12, a three-dimensional object recognition section 13, an area-under-vehicle recognition section 14, and a parkable area recognition section 16. The in-vehicle image processing device 1 of the present embodiment further includes an image acquisition section 11b as a part of the overhead image generation section 11, a sensor output acquisition section 15, a screen setting section 17, and a control signal generation section 18.

The image acquisition section 11b acquires image data from the vehicle-mounted camera 2 mounted in the vehicle 100 under control of the CPU and stores the acquired image data in the storage device. Likewise, the sensor output acquisition section 15 acquires measurement data including speed and acceleration of the vehicle 100 from the in-vehicle sensor 3 mounted in the vehicle 100 under control of the CPU and stores the acquired measurement data in the storage device. The sensor output acquisition section 15 also may calculate the traveling route and a total travel distance of the vehicle 100 from the measurement data acquired from the in-vehicle sensor 3 by using the CPU and may store the calculated traveling route and total travel distance in the storage device as the measurement data.

The image converter 11a generates an overhead image around the vehicle 100 that is viewed downward from a virtual viewpoint assumed above the vehicle 100 by converting a viewpoint of the image data that has been acquired by the image acquisition section 11b from the vehicle-mounted camera 2 and stored in the storage device. At this time, the image converter 11a recognizes a road surface R from the image data of the vehicle-mounted camera 2 under control of the CPU, applies coordinate transformation to the image data with the road surface R as a reference to generate an overhead image around the vehicle 100, and then stores the image data in the storage device as overhead image data. The coordinate transformation is performed by using a coordinate transformation table generated on the basis of camera parameters. The camera parameters include focal length, pixel pitch, lens distortion, and mounted position and posture of the vehicle-mounted camera 2 in the vehicle 100.

The image converter 11a is capable of converting a video taken for a range of a predetermined distance from the vehicle 100 by using the camera parameters to generate an overhead image. A technique of generating an overhead image from an image of the vehicle-mounted camera 2 is a known technique that is in practical use as a monitoring system for around a vehicle, and thus description of a detailed processing method thereof is not provided here. The overhead image generated by the image converter 11a is used in the three-dimensional object recognition section 13 and the tire recognition section 12 and used as an original of an image that is to be finally displayed in the image display 4.

As described above, the overhead image generation section 11 of the present embodiment includes the image acquisition section 11b and the image converter 11a to generate an overhead image with the road surface R as a reference by converting a viewpoint of an image of the nearby vehicles V and the road surface R taken by the vehicle-mounted camera 2 mounted in the vehicle 100.

If the vehicle-mounted camera 2 is a monaural camera, the three-dimensional object recognition section 13 recognizes an area where a three-dimensional object including a vehicle body and a tire of the nearby vehicle V exist on the basis of the following data. One piece of the data is data on a plurality of overhead images generated by the image converter 11a from a plurality of images acquired by the image acquisition section 11b at different times. The other piece of the data is measurement data of the in-vehicle sensor 3 acquired by the sensor output acquisition section 15 while the image acquisition section 11b acquires the plurality of images.

The three-dimensional object recognition section 13 acquires a first overhead image generated from a first image taken at a certain time and a second overhead image generated from a second image taken after a predetermined time elapses from the certain time at which the first image is taken, for example. Then, the three-dimensional object recognition section 13 stores time stamps of respective times at which the image acquisition section 11b acquires the first image and the second image, and the first overhead image and the second overhead image, in association respectively, in the storage device.

In addition, the three-dimensional object recognition section 13 moves the first overhead image parallel or rotationally on the basis of measurement data acquired from the in-vehicle sensor 3, such as on a travel distance and a yaw angle and then acquires a difference image by performing a process of subtracting the second overhead image from the first overhead image after being moved. The first overhead image is moved parallel or rotationally and the process of subtraction is performed here such that road surface patterns of the first overhead image and the second overhead image are superimposed on each other, and thus the difference decreases on the road surface R, and the difference increases in an area where a three-dimensional object other than the road surface R exists. The three-dimensional object recognition section 13 applies labeling processing to the difference image to generate a label image.

The labeling processing includes calculating a density difference with neighbor pixels thereof for each pixel included in the difference image, labeling each area with an identical number as an area characteristic number when the density difference is within a predetermined range, and outputting the resultant image as a label image. In the labeling processing, a portion where a difference in density is less than a predetermined value in the difference image is treated as the road surface R or an unknown area. However, an unknown area near the vehicle 100 itself may be treated as the road surface R. That is, in the label image, the road surface R around the vehicle 100 and an area where three-dimensional objects including a vehicle body of each of the nearby vehicles V parked around the vehicle 100 exist are recognized.

Image processing performed by the three-dimensional object recognition section 13 for recognizing three-dimensional objects including a vehicle body of each of the nearby vehicles V may be performed by using a plurality of images of the vehicle-mounted camera 2, acquired by the image acquisition section 11b, instead of an overhead image. As described above, the three-dimensional object recognition section 13 recognizes three-dimensional objects including a vehicle body of each of the nearby vehicles V from an image of the vehicle-mounted camera 2 or an overhead image.

In a case where images of the nearby vehicles V are taken in an image of the vehicle-mounted camera 2 acquired by the image acquisition section 11b or an overhead image generated by the image converter 11a, the tire recognition section 12 applies a process of extracting an edge of a vehicle body of each of the nearby vehicles V or image processing such as pattern matching, for example, to the image of the vehicle-mounted camera 2 or the overhead image. Through such image processing, the tire recognition section 12 directly recognizes a tire of the nearby vehicle V in an overhead image or recognizes the tire of the nearby vehicle V from an image of the vehicle-mounted camera 2 and converts a position and an area of the tire to a position and an area in the overhead image, thereby recognizing the position and the area of the tire in the overhead image. A technique of recognizing a tire from an image is known, and thus further detailed description thereof is not provided here. As described above, the tire recognition section 12 recognizes a tire of each of the nearby vehicles V from an image of the vehicle-mounted camera 2 or an overhead image.

Figure 3:
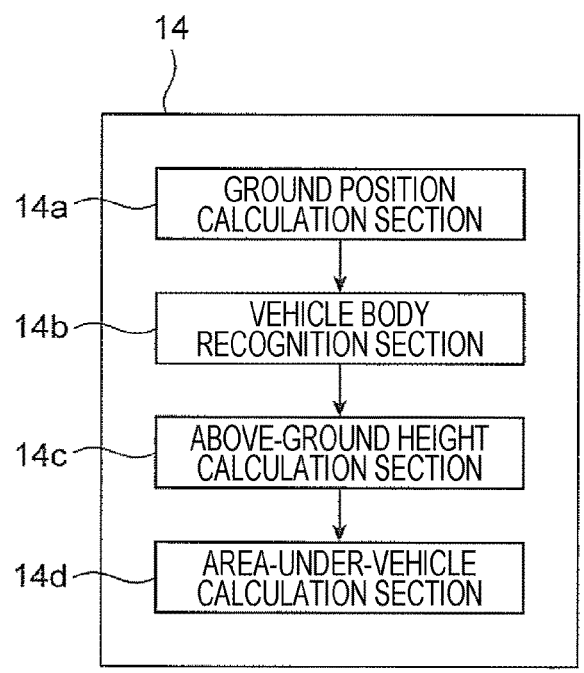
FIG. 3 is a block diagram illustrating a more detailed configuration of an area-under-vehicle recognition section illustrated in FIG. 2.

FIG. 3 is a block diagram illustrating a more detailed configuration of the area-under-vehicle recognition section 14 illustrated in FIG. 2. The area-under-vehicle recognition section 14 includes a ground position calculation section 14a, a vehicle body recognition section 14b, an above-ground height calculation section 14c, and an area-under-vehicle calculation section 14d. Accordingly, the area-under-vehicle recognition section 14 can calculate a ground contact position of a tire of each of the nearby vehicles V and above-ground height from the ground position to a vehicle body of each of the nearby vehicles V to recognize an area under the vehicle body, the area being the road surface R positioned under the vehicle body in an overhead image, on the basis of the above-ground height. Hereinafter, each component of the area-under-vehicle recognition section 14 will be described in detail.

FIG. 4 is an image illustrating image processing by the area-under-vehicle recognition section 14. FIG. 4A illustrates an example of an image of the vehicle-mounted camera 2 acquired by the image acquisition section 11b. FIGS. 4B to 4E each illustrate a procedure of recognizing an area-under-vehicle Rd on the basis of an overhead image generated by the image converter 11a. FIG. 4F illustrates the area-under-vehicle Rd in an image of the vehicle-mounted camera 2 corresponding to the area-under-vehicle Rd illustrated in FIG. 4E.

Figure 4A:
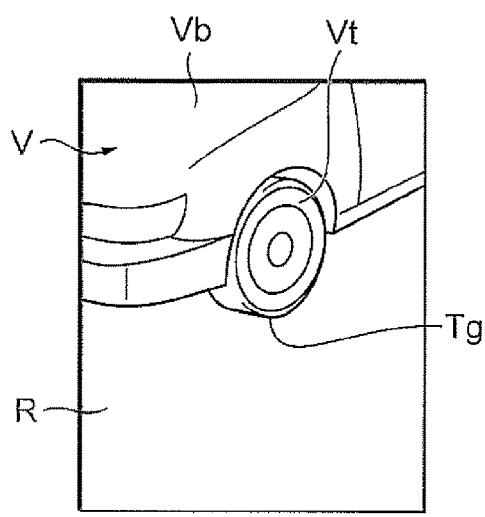
FIG. 4A is an image illustrating image processing by the area-under-vehicle recognition section.
Figure 4B:
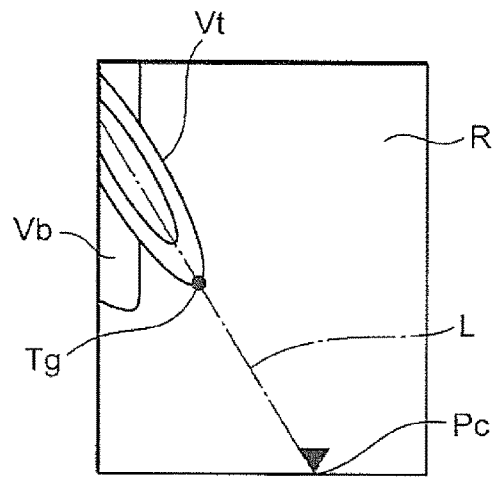
FIG. 4B is an image illustrating image processing by the area-under-vehicle recognition section.

The ground position calculation section 14a recognizes a ground position Tg of a tire Vt by using an overhead image generated by the image converter 11a from a camera image illustrated in FIG. 4A, the overhead image being illustrated in FIG. 4B. Each of the camera image and the overhead image includes a vehicle body Vb and the tire Vt of a nearby vehicle V.

First, the ground position calculation section 14a acquires an area where a three-dimensional object exists in the overhead image from the three-dimensional object recognition section 13. The area where a three-dimensional object exists in the overhead image is recognized as an area acquired by combining an area where the vehicle body Vb exists and an area where the tire Vt exists. The ground position calculation section 14a also acquires a position and an area of the tire Vt in the overhead image from the tire recognition section 12.

Next, the ground position calculation section 14a calculates a contour of the tire Vt on the basis of the position and the area of the tire Vt in the overhead image to recognize the ground position Tg of the tire Vt. More specifically, the ground position calculation section 14a selects an area including the entire tire Vt and applies edge extraction processing, luminance correction processing, circle detection processing, and the like, for example, to the area to recognize an outer peripheral portion or an outer peripheral contour of the tire Vt. Then, edge direction extraction processing is applied to the outer periphery contour to calculate a tangential direction, and it is determined whether the tangential direction or an edge direction is parallel to the road surface R. A point closest to a bottom of a screen among points at which the edge direction of the outer periphery contour is parallel to the road surface R is recognized as the ground position Tg of the tire Vt.

In the example illustrated in FIG. 4B, a ground point or the ground position Tg of the tire Vt of the nearby vehicle V is a point or a position in the outer periphery contour of the tire Vt having the shortest distance to the position Pc of the vehicle-mounted camera 2. That is, when a straight line L intersecting with the outer periphery contour of the tire Vt is drawn from the position Pc of the vehicle-mounted camera 2, a position of an intersection having the shortest distance from an intersection of the outer periphery contour and the straight line L to the position Pc of the vehicle-mounted camera 2 is the ground point or the ground position Tg of the tire Vt. The ground position calculation section 14a may calculate the ground point or the ground position Tg of the tire Vt on the basis of an image of the vehicle-mounted camera 2 instead of an overhead image. As described above, the ground position calculation section 14a calculates the ground point or the ground position Tg of the tire Vt on the basis of a position and an area of the tire Vt in an image of the vehicle-mounted camera 2 or an overhead image.

The vehicle body recognition section 14b recognizes the vehicle body Vb of the nearby vehicle V from three-dimensional objects including the vehicle body Vb and the tire Vt of the nearby vehicle V recognized by the three-dimensional object recognition section 13. Then, the vehicle body recognition section 14b recognizes a three-dimensional object adjacent to the tire Vt recognized by the tire recognition section 12 as the vehicle body Vb.

For example, in a case where a label of a label image generated by the three-dimensional object recognition section 13 has one-to-one correspondence with a three-dimensional object, the vehicle body recognition section 14b reads a label corresponding to a position of the tire Vt from the label image. Then, the vehicle body recognition section 14b recognizes a three-dimensional object adjacent to the tire Vt, having a label with a number identical with a label number corresponding to the position of the tire Vt, as the vehicle body Vb. In contrast, in a case where a label image generated by the three-dimensional object recognition section 13 has no one-to-one correspondence with a three-dimensional object, the vehicle body recognition section 14b recognizes contour lines Lp1 and Lp2 of a three-dimensional object extending along the road surface R. Then, the vehicle body recognition section 14b recognizes a three-dimensional object having the contour lines Lp1 and Lp2 extending along the road surface R, the three-dimensional object being adjacent to the tire Vt, as the vehicle body Vb.

Figure 5:
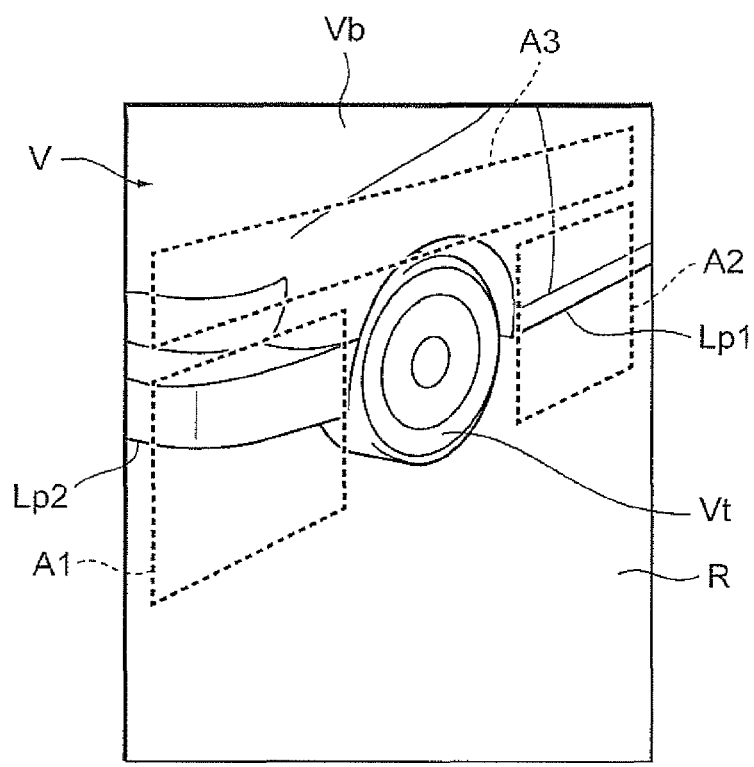
FIG. 5 is an image illustrating an example of a process of recognizing a vehicle body by a vehicle body recognition section.

FIG. 5 is an image illustrating an example of processing of recognizing the vehicle body Vb from three-dimensional objects recognized by the three-dimensional object recognition section 13 by the vehicle body recognition section 14b. Here, the three-dimensional object illustrated in FIG. 5 is the nearby vehicle V photographed by the vehicle-mounted camera 2 and includes the vehicle body Vb and the tire Vt. The vehicle body recognition section 14b divides an area above the road surface R, surrounding a position and a range of the tire Vt recognized by the tire recognition section 12, into three areas: a front area A1; a rear area A2; and an upper area A3, for example. The number of divided areas is not particularly limited.

The vehicle body recognition section 14b determines whether there is the three-dimensional object for each area on the basis of a position of the three-dimensional object recognized by the three-dimensional object recognition section 13. The vehicle body recognition section 14b also applies edge extraction to an image acquired by the image acquisition section 11b for each of the areas A1, A2, and A3 to emphasis a contour. This contour information is obliquely projected in a predetermined direction, and with reference to the acquired frequency histogram, a circumscribed rectangle covering the entire vehicle body Vb is calculated.

Figure 4C:
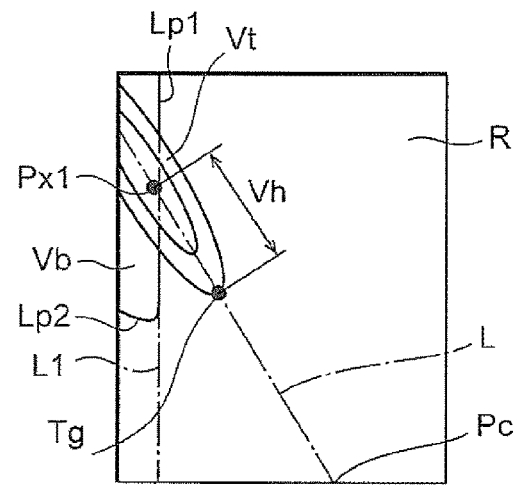
FIG. 4C is an image illustrating image processing by the area-under-vehicle recognition section.
Figure 4D:
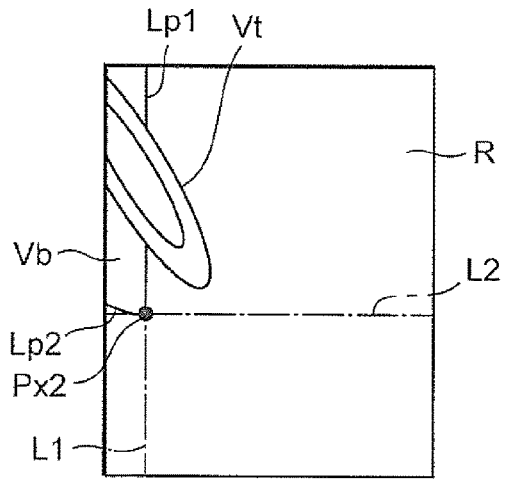
FIG. 4D is an image illustrating image processing by the area-under-vehicle recognition section.

That is, the vehicle body recognition section 14b calculates the contour line Lp1 at a lower end of a side face of the vehicle body Vb and its extension line L1 illustrated in FIGS. 4C and 4D by calculating a position of the vehicle body Vb from a positional relation between the vehicle body Vb and the tire Vt of the nearby vehicle V and obliquely projecting contour information on the vehicle body Vb in a predetermined direction to calculate a frequency histogram of the contour information. Likewise, the vehicle body recognition section 14b calculates the contour line Lp2 at a lower end of the front or the rear of the vehicle body Vb and its extension line L2 illustrated in FIG. 4D. As described above, the vehicle body recognition section 14b recognizes the vehicle body Vb of the nearby vehicle V from a three-dimensional object recognized by the three-dimensional object recognition section 13.

The above-ground height calculation section 14c calculates an above-ground height Vh of the nearby vehicle V, being a height from the ground position Tg to the vehicle body Vb, on the basis of the ground position Tg of the tire Vt calculated by the ground position calculation section 14a and the position of the vehicle body Vb recognized by the vehicle body recognition section 14b. More specifically, the above-ground height calculation section 14c calculates a distance from the ground position Tg of the tire Vt to the extension line L1 of the contour line Lp1 of the vehicle body Vb as the above-ground height V. That is, the above-ground height calculation section 14c sets a perpendicular line perpendicular to the road surface R and measures a distance between the ground position Tg and the extension line L1 of the contour line Lp1 of the vehicle body Vb or a distance between the ground position Tg and a lower side of the circumscribed rectangle of the vehicle body Vb along the set perpendicular line to calculate the above-ground height Vh.

For example, above-ground height calculation section 14c calculates an intersection Px1 of the straight line L passing through the position Pc of the vehicle-mounted camera 2 and the ground position Tg of the tire Vt and the extension line L1 of the contour line Lp1 at the lower end of the side face of the vehicle body Vb as illustrated in FIG. 4C, and calculates a distance between the intersection Px1 and the ground point or the ground position Tg as the above-ground height Vh from the ground position Tg of the tire Vt of the nearby vehicle V to the vehicle body Vb. As described above, the above-ground height calculation section 14c calculates the above-ground height Vh of the nearby vehicle V on the basis of a distance from the ground position Tg of the tire Vt of the nearby vehicle V to the vehicle body Vb.

Figure 4E:
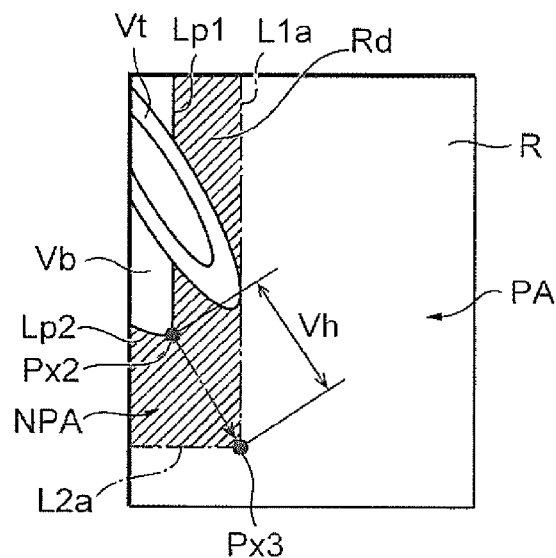
FIG. 4E is an image illustrating image processing by the area-under-vehicle recognition section.

The area-under-vehicle calculation section 14d calculates the area-under-vehicle Rd that is an area on the road surface R and is positioned under the vehicle body Vb on the basis of the contour line Lp1 and the above-ground height Vh. The contour line Lp1 is at the lower end of the vehicle body Vb and calculated by the above-ground height calculation section 14c. The area under the area-under-vehicle calculation section 14d calculates an intersection Px2 of the extension line L1 of the contour line Lp1 at the lower end of the side face of the vehicle body Vb calculated by the vehicle body recognition section 14b and the extension line L2 of the contour line Lp2 at lower end of the front or the rear of the vehicle body Vb as illustrated in FIG. 4D. The area-under-vehicle calculation section 14d calculates a point Px3 acquired by moving the intersection Px2 parallel to a perpendicular line with respect to the road surface R or the straight line L passing through the position and tire Vt of the vehicle-mounted camera 2 and the ground position Tg by a distance same as the above-ground height Vh as illustrated in FIGS. 4C and 4E.

In addition, the area-under-vehicle calculation section 14d calculates the area-under-vehicle Rd with respect to the point Px3 acquired by moving the intersection Px2. For example, the area-under-vehicle calculation section 14d calculates a straight line L1a that is parallel to the extension line L1 of the contour line Lp1 at the lower end of the side face of the vehicle body Vb and passes through the point Px3, and a straight line L2a that is parallel to the extension line L2 of the contour line Lp2 at the lower end of the front or rear of the vehicle body Vb and passes through the point Px3 as shown in FIGS. 4D and 4E. Then, the area-under-vehicle calculation section 14d calculates an area between the contour lines Lp1 and Lp2, and the straight lines L1a and L2a as the area-under-vehicle Rd, for example.

Figure 4F:
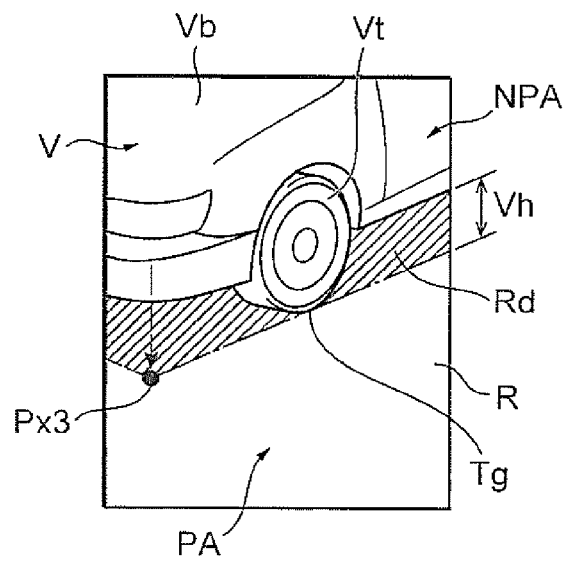
FIG. 4F is an image illustrating image processing by the area-under-vehicle recognition section.

Further, the area-under-vehicle calculation section 14d may convert coordinates of each point in the area-under-vehicle Rd, calculated in an overhead image, to coordinates on the road surface R being a reference plane with a height of 0 m or a ground surface. Accordingly, an area, as illustrated in FIG. 4F, on the road surface R positioned under the vehicle body Vb can be recognized as the area-under-vehicle Rd in an image of the vehicle-mounted camera 2, acquired by the image acquisition section 11b, and can be output.

As described above, the area-under-vehicle recognition section 14 calculates the ground position Tg of the tire Vt and the above-ground height Vh from the ground position Tg to the lower end of the vehicle body Vb by using the ground position calculation section 14a, the vehicle body recognition section 14b, the area-under-vehicle calculation section 14d, and the above-ground height calculation section 14c, and recognizes the area-under-vehicle Rd on the road surface R, positioned under the vehicle body Vb, on the basis of the above-ground height Vh.

As illustrated in FIG. 2, the parkable area recognition section 16 acquires the area where the vehicle body Vb exists and the area-under-vehicle Rd, the areas being recognized by the area-under-vehicle recognition section 14, and recognizes the areas as a non-parkable area NPA. The parkable area recognition section 16 also recognizes the position and the range of the tire Vt, recognized by the tire recognition section 12, as the non-parkable area NPA. Then, the parkable area recognition section 16 recognizes the parkable area PA in the road surface R on the basis of the non-parkable area NPA.

The parkable area recognition section 16 recognizes an area where a three-dimensional object other than the nearby vehicle V exists and an area on the road surface R other than the non-parkable area NPA as the parkable area PA, for example. The parkable area recognition section 16 may recognize the parkable area PA from an area on the road surface R except the area where a three-dimensional object other than the nearby vehicle V exists and the non-parkable area NPA in consideration of a size of the vehicle 100 to be parked, and the like, for example. In this case, if a size of an area between the nearby vehicles V is more than the size of the vehicle 100, for example, the area is recognized as the parkable area PA. If the size of the area between the nearby vehicles V is less than the size of the vehicle 100, for example, the area is recognized as the non-parkable area NPA.

The screen setting section 17 performs screen setting to allow the image display 4 mounted in the vehicle 100 to display the parkable area PA. For example, the screen setting section 17 performs screen setting to display the parkable area PA recognized by the parkable area recognition section 16 in an overhead image generated by the image converter 11a. The screen setting section 17 also can perform screen setting to display the parkable area PA in an image of the vehicle-mounted camera 2 acquired by the image acquisition section 11b.

The control signal generation section 18 generates a control signal targeting the parkable area PA and outputs the control signal to the vehicle control unit 5. More specifically, the control signal generation section 18 compares a present position of the vehicle 100 with a future parking position of the vehicle 100 in the parkable area PA to calculate a difference between the positions, for example, and the vehicle control unit 5 generates a control signal on the basis of the difference between the positions so that the vehicle 100 can be moved while the vehicle 100 and the nearby vehicle V are prevented from colliding with each other.

Hereinafter, operation of the in-vehicle image processing device 1 of the present embodiment will be described.

FIG. 6 is a flow chart illustrating processing steps S1 to S15 of the in-vehicle image processing device 1. As illustrated in FIG. 1, when the vehicle 100 approaches a side of the parking space P between the nearby vehicles V, the vehicle-mounted camera 2 provided in the side mirror of the vehicle 100, for example, takes images of the road surface R from obliquely front of the vehicle 100 to obliquely rear of the vehicle 100 and the nearby vehicles V on the road surface R (step S1). The in-vehicle sensor 3 measures speed, acceleration, travel distance, yaw angle, and the like of the vehicle 100, for example (step S2). The image acquisition section 11b acquires the images taken by the vehicle-mounted camera 2 as image data (step S3). The sensor output acquisition section 15 acquires measurement data measured by the in-vehicle sensor 3 (step S4).

The image converter 11a converts a viewpoint of the image data acquired from the image acquisition section 11b to generate an overhead image with respect to the road surface R (step S5). As described above, the in-vehicle image processing device 1 of the present embodiment includes the image acquisition section 11b and the image converter 11a as the overhead image generation section 11. Thus, the overhead image generation section 11 can acquire images from the vehicle-mounted camera 2 by using the image acquisition section 11b and can convert a viewpoint of the plurality of images acquired by the image acquisition section 11b by using the image converter 11a. This enables the overhead image generation section 11 to generate an overhead image with the road surface R as a reference by converting a viewpoint of images of the nearby vehicle V and the road surface R taken by the vehicle-mounted camera 2 mounted in the vehicle 100.

The three-dimensional object recognition section 13 generates a difference image on the basis of a plurality of overhead images acquired from the image converter 11a and measurement data acquired from the sensor output acquisition section 15 (step S6). In addition, the three-dimensional object recognition section 13 extracts a three-dimensional object including the vehicle body Vb and the tire Vt of the nearby vehicle V on the basis of the difference image (step S7). As describe above, the in-vehicle image processing device 1 of the present embodiment can recognize a three-dimensional object by allowing the three-dimensional object recognition section 13 to calculate differences among a plurality of images or a plurality of overhead images. The in-vehicle image processing device 1 includes the sensor output acquisition section 15, and thus can acquires measurement data from the in-vehicle sensor 3 that measures speed, acceleration, travel distance, angular speed, and the like of the vehicle 100.

The three-dimensional object recognition section 13 also acquires the first and second overhead images generated by the image converter 11a on the basis of the first and second images taken by the vehicle-mounted camera 2 at different times. In addition, the three-dimensional object recognition section 13 performs a process of subtracting the second overhead image from the first overhead image that has been moved parallel or rotationally on the basis of measurement data acquired from the sensor output acquisition section 15 to recognize a three-dimensional object. Thus, the in-vehicle image processing device 1 of the present embodiment can recognize a three-dimensional object from an image of the vehicle-mounted camera 2 or an overhead image even if a monaural camera is used as the vehicle-mounted camera 2.

After recognition of a three-dimensional object by the three-dimensional object recognition section 13 or in parallel with the recognition, the tire recognition section 12 detects and recognizes the tire Vt of the nearby vehicle V from an image of the vehicle-mounted camera 2, acquired by the image acquisition section 11b, or an overhead image in which a viewpoint is converted by the image converter 11a (step S8).

Next, the area-under-vehicle recognition section 14 uses the ground position calculation section 14a, for example, to calculate a ground point or a ground position Tg of the tire Vt on the basis of a position and an area of the tire Vt in an image of the vehicle-mounted camera 2 or an overhead image (step S9). Subsequently, the area-under-vehicle recognition section 14 uses the vehicle body recognition section 14b to detect a vehicle body area where the vehicle body Vb exists from a three-dimensional object including the vehicle body Vb and the tire Vt of the nearby vehicle V, recognized by the three-dimensional object recognition section 13, for example, to recognize the vehicle body Vb of the nearby vehicle V (step S10). Then, the area-under-vehicle recognition section 14 the above-ground height calculation section 14c, for example, to calculate an above-ground height Vh of the nearby vehicle V, being a height from the ground position Tg to the vehicle body Vb, on the basis of the ground position Tg of the tire Vt calculated by the ground position calculation section 14a and the position of the vehicle body Vb recognized by the vehicle body recognition section 14b (step S11).

Subsequently, the area-under-vehicle recognition section 14 uses the area-under-vehicle calculation section 14d, for example, to calculate the area-under-vehicle Rd that is an area on the road surface R and is positioned under the vehicle body Vb, on the basis of the contour line Lp1 at the lower end of the vehicle body Vb, calculated by the above-ground height calculation section 14c and the above-ground height Vh (step S12). As described above, the in-vehicle image processing device 1 of the present embodiment includes the area-under-vehicle recognition section 14 that calculates a ground position Tg of the tire Vt and an above-ground height Vh from the ground position Tg to the vehicle body Vb to recognize the area-under-vehicle Rd being the road surface R positioned under the vehicle body Vb in an overhead image on the basis of the above-ground height Vh. Thus, an area positioned under the vehicle body Vb on the road surface R in an overhead image is not incorrectly determined as the parkable area PA.

Meanwhile, in a case where the area-under-vehicle recognition section 14 is not provided, the non-parkable area NPA on the road surface R, positioned under the vehicle body Vb of the nearby vehicle V in an overhead image as illustrated in FIG. 4E, is determined as the parkable area PA. This is caused by reasons that the nearby vehicle V has a predetermined above-ground height Vh from the road surface R to the vehicle body Vb, the road surface R positioned immediately under the nearby vehicle V is taken in an image of the vehicle-mounted camera 2, and the vehicle body Vb and the tire Vt being a three-dimensional object do not exist on the road surface R. That is, in a case where the area-under-vehicle recognition section 14 is not provided, generating an overhead image by converting a viewpoint of an image of the vehicle-mounted camera 2 with the road surface R as a reference does not enable discrimination between the road surface R immediately under the nearby vehicle V where the vehicle 100 actually cannot be parked and a parkable road surface R around the nearby vehicle V. As a result, the non-parkable area NPA where the nearby vehicle V exists may be determined smaller than an actual size thereof, so that the vehicle 100 may collide with the nearby vehicle V when parked.

In contrast, the in-vehicle image processing device 1 of the present embodiment includes the area-under-vehicle recognition section 14 that calculates a ground position Tg of the tire Vt and an above-ground height Vh from the ground position Tg to the vehicle body Vb to recognize the area-under-vehicle Rd being the road surface R positioned under the vehicle body Vb in an overhead image on the basis of the above-ground height Vh. Thus, the in-vehicle image processing device 1 of the present embodiment can accurately determine the parkable area PA by discriminating the road surface R immediately under the nearby vehicle V where the vehicle 100 cannot be parked and a parkable road surface R around the nearby vehicle V, and can correctly recognizes a target parking position even in a place without a parking lot line. Since recognition of a license plate is unnecessary, the parkable area PA can be accurately determined even if the vehicle 100 before attaching a license plate is moved to be parked, or a license plate cannot be recognized with some cause, for example.

Since the in-vehicle image processing device 1 of the present embodiment uses a method of recognizing the tire Vt of the nearby vehicle V, the parkable area PA can be correctly recognized regardless of a size of the nearby vehicle V and a kind thereof (e.g. a light vehicle such as a small-sized vehicle, a normal passenger vehicle, and a large-sized vehicle). In addition, even if each rear wheel has two tires like some buses and trucks, a tire on an outermost side is recognized, and thus the parkable area PA can be correctly recognized regardless of existence of a tire on an inner side.

As illustrated in FIG. 1A, in a case of multi-space parking in which the vehicle 100 is parked toward a direction intersecting with a direction of travel of the vehicle 100 the vehicle 100 when parked in the parkable area PA, a width of the parking space is acquired from a distance from a side face of each of adjacent nearby vehicles V and V in front and rear of the direction of travel of the vehicle 100, sot that the parking space can be recognized as the parkable area. In addition, as illustrated in FIG. 1B, in a case of parallel parking in which the vehicle 100 is parked toward a direction of travel thereof when parked in the parkable area PA, a width of the parking space is acquired from a back face and a front face of each of adjacent nearby vehicles V and V in front and rear of the direction of travel of the vehicle 100, so that the parking space can be recognized as the parkable area PA.

The area-under-vehicle recognition section 14 includes the ground position calculation section 14a, the vehicle body recognition section 14b, the above-ground height calculation section 14c, and the area-under-vehicle calculation section 14d. Thus, the area-under-vehicle recognition section 14 can calculate the ground position Tg of the tire Vt of the nearby vehicle V on the basis of an image of the vehicle-mounted camera 2 or an overhead image by using the ground position calculation section 14a. In addition, the area-under-vehicle recognition section 14 recognizes the vehicle body Vb from a three-dimensional object by using the vehicle body recognition section 14b, and can calculate the area-under-vehicle Rd on the basis of the contour line Lp1 at the lower end of the vehicle body Vb and the above-ground height Vh by using the above-ground height calculation section 14c. Then, the area-under-vehicle recognition section 14 can calculate the area-under-vehicle Rd on the basis of the contour lines Lp1 and Lp2 at the lower end of the vehicle body Vb and the above-ground height Vh by using the area-under-vehicle calculation section 14d. Since the vehicle body recognition section 14b recognizes a three-dimensional object adjacent to the tire Vt recognized by the tire recognition section 12 as the vehicle body Vb, the vehicle body Vb of the nearby vehicle V can be extracted from the three-dimensional object for recognition.

As described above, after the area-under-vehicle recognition section 14 determines the area-under-vehicle Rd, the parkable area recognition section 16 recognizes an area where the vehicle body Vb of the nearby vehicle V exists and the area-under-vehicle Rd as a non-parkable area NPA, and then recognizes the parkable area PA on the road surface R on the basis of the non-parkable area NPA (step S13). As described above, there is provided the parkable area recognition section 16 that recognizes the area where the vehicle body Vb of the nearby vehicle V exists and the area-under-vehicle Rd as the non-parkable area NPA. As a result, the non-parkable area NPA is not recognized to be smaller than an actual size thereof, and thus the vehicle 100 can be prevented from colliding with the nearby vehicle V when parked.

In addition, the screen setting section 17 performs screen setting for the image display 4 mounted in the vehicle 100 to display the parkable area PA (step S14). This enables the image display 4 to display an image of the vehicle-mounted camera 2 or an overhead image along with the parkable area PA. Last, the image display 4 displays an image of the vehicle-mounted camera 2 or an overhead image along with the parkable area PA in its screen on the basis of setting by the screen setting section 17 (step S15). As a result, parking of the vehicle 100 by a driver can be assisted or automatic parking of the vehicle 100 can be performed by generating a control signal on the basis of the parkable area PA by using the control signal generation section 18 and controlling the vehicle 100 by using the vehicle control unit 5.

As described above, the in-vehicle image processing device 1 of the present embodiment can accurately determine the parkable area PA by processing an image of the vehicle-mounted camera 2 without being based on the premise that a license plate of the vehicle is recognized and even in a place without a parking lot line.

While the embodiment of the present invention is described above in detail with reference to the drawings, a specific configuration is not limited to the embodiment, and thus even a design change or the like that does not depart from the scope of the present invention should be included in the present invention.

For example, in the embodiment described above, the in-vehicle image processing device, the vehicle-mounted camera, the in-vehicle sensor, and the image display are described as separated components. However, at least one of the image processing device, the vehicle-mounted camera, the in-vehicle sensor, and the image display may be included in the image processing device. In addition, in the embodiment described above, while the vehicle-mounted camera is described as a monaural camera, the vehicle-mounted camera may be a stereo camera. In this case, the three-dimensional object recognition section can recognize an area where a three-dimensional object exists, on the basis of two images taken at the same time by the stereo camera.

REFERENCE SIGNS LIST

1 in-vehicle image processing device
2 vehicle-mounted camera
3 in-vehicle sensor
4 image display
11 overhead image generation section
11a image converter
11b image acquisition section
12 tire recognition section
13 three-dimensional object recognition section
14 area-under-vehicle recognition section
14a ground position calculation section
14b vehicle body recognition section
14c above-ground height calculation section
14d area-under-vehicle calculation section
15 sensor output acquisition section
16 parkable area recognition section
17 screen setting section
100 vehicle
NPA non-parkable area
PA parkable area
R road surface
Rd area under vehicle body
Tg ground position
V nearby vehicle
Vb vehicle body (three-dimensional object)
Vh above-ground height
Vt tire

The invention claimed is:

1. An in-vehicle image processing device for recognizing a parkable area around a vehicle, the device comprising:
an overhead image generation section configured to generate an overhead image with a road surface as a reference by converting a view point of an image of a nearby vehicle and the road surface taken by a vehicle-mounted camera;
a tire recognition section configured to recognize tires of the nearby vehicle from the image or the overhead image;
a three-dimensional object recognition section configured to recognize, from the camera image or the overhead image, three-dimensional objects including a vehicle body of the nearby vehicle;
an area-under-vehicle recognition section configured to calculate a ground contact position of the tire and an above-ground height from the ground contact position to the vehicle body and recognize an area under the vehicle body on the road surface from the overhead image based on the above-ground height; and
a parkable area recognition section configured to recognize an area occupied by the vehicle body and the area under the vehicle body as a non-parkable area and recognize, based on the non-parkable area, a parkable area on the road surface.

2. The in-vehicle image processing device according to claim 1, wherein the area-under-vehicle recognition section includes:
  a ground position calculation section that calculates the ground position based on the image or the overhead image;
  a vehicle body recognition section that recognizes the vehicle body from the three-dimensional object;
  an above-ground height calculation section that calculates the above-ground height based on a distance from the ground position to the vehicle body; and
  an area-under-vehicle calculation section that calculates the area under the vehicle body based on a contour line of the vehicle body and the above-ground height.

3. The in-vehicle image processing device according to claim 2, wherein the vehicle body recognition section recognizes the three-dimensional object adjacent to the tire recognized by the tire recognition section as the vehicle body.

4. The in-vehicle image processing device according to claim 1, further comprising a screen setting section that performs screen setting for an image display mounted in the vehicle to display the parkable area.

5. The in-vehicle image processing device according to claim 1, wherein the overhead image generation section includes:
  an image acquisition section that acquires the image from the camera; and
  an image converter that converts a viewpoint of a plurality of the images acquired by the image acquisition section.

6. The in-vehicle image processing device according to claim 1, wherein the three-dimensional object recognition section recognizes the three-dimensional object from differences between the plurality of the images or a plurality of the overhead images.

7. The in-vehicle image processing device according to claim 6, further comprising a sensor output acquisition section configured to acquire measurement data from an in-vehicle sensor that measures speed and angular speed of the vehicle,
  wherein the three-dimensional object recognition section acquires a first overhead image and a second overhead image generated by the overhead image generation section based on a first image and a second image taken by the camera at different times, and recognizes the three-dimensional object by performing a process of subtracting the second overhead image from the first overhead image, which have been moved parallel or rotationally based on the measurement data acquired from the sensor output acquisition section.

* * * * *